United States Patent [19]
Bertrand

[11] 3,735,790
[45] May 29, 1973

[54] PNEUMATIC TIRE

[75] Inventor: Marcel J. Bertrand, Grivengnee-Liege, Belgium

[73] Assignee: Uniroyal Englebert Deutschland AG, Aachen, Germany

[22] Filed: Oct. 26, 1970

[21] Appl. No.: 83,976

[30] Foreign Application Priority Data

Nov. 5, 1969 Germany.....................P 19 55 669.5
Dec. 4, 1969 Germany.....................P 19 60 943.9

[52] U.S. Cl..............................................152/361
[51] Int. Cl................................................B60c 9/18
[58] Field of Search.....................152/354, 355, 356, 152/361

[56] References Cited

UNITED STATES PATENTS

| | | | |
|---|---|---|---|
| 3,057,392 | 10/1962 | Nallinger | 152/361 |
| 3,095,026 | 6/1963 | Weber | 152/355 |
| 3,043,357 | 7/1962 | Bagnuk et al | 152/361 |
| 3,195,604 | 7/1965 | Boussu et al | 152/361 |

FOREIGN PATENTS OR APPLICATIONS 1,435,804  3/1966  France ..........................152/361

Primary Examiner—George H. Libman
Assistant Examiner—George H. Libman
Attorney—Charles A. Blank

[57] ABSTRACT

A radial ply tire in which grooves due to wear at the edge regions of the tread are minimized. One embodiment of the tire includes a radial ply carcass, a layer of fiber-reinforced rubber material, a pair of circumferentially extending strips of fabric at the shoulder regions having cords obliquely disposed with respect to the circumference of the tire, a circumferential belt, and tread and sidewall portions.

9 Claims, 3 Drawing Figures

INVENTOR.
MARCEL J. BERTRAND

INVENTOR.
MARCEL J. BERTRAND
BY
Charles A. Blank
ATTORNEY

PNEUMATIC TIRE

This invention relates to pneumatic tires for motor vehicles and, more particularly, to tires of the type comprising a radial carcass, a belt of at least one layer of cords oriented approximately in circumferential direction, and a layer of fiber-reinforced rubber material.

As used herein, the term "cords" is intended to include threads, filaments, yarns, wires, cables, bands, braids, and the like.

It is known to use layers of rubber reinforced with short fibers at various points of the tire. The fibers used can consist, for example, of textile material, of a plastic material or of metal. The fibers can be oriented in certain directions or be disordered. It is known to produce at least one layer of the belt of such a rubber material mixed with fibers in order to reinforce the belt. It is also known to arrange strips of this material in the sidewall zones in order to stiffen the latter. Furthermore, bands of fiber-reinforced rubber material having been wound around the bead rings to replace the narrow strips of rubberized steel or textile cord in anchoring the bead ring to the carcass.

It is also known to use layers of fiber-reinforced rubber material in tires in order to reduce or prevent the transmission of vibrations of relatively low frequency from the tread of the tire to the vehicle. To this end such a layer was arranged between the tread and the belt. The belt as a whole has also been embedded between two such layers, which extend to the sidewall regions.

The present invention concerns a different problem found in tires. It has been found in practice that in tires with a radial carcass and a reinforcing layer of textile or metallic cord fabric, the outer regions, particularly the outer circumferential rib of the thread profile, wear out more quickly than the central region of the tread. Depending on the profiling of the tread and the internal structure of the tire, the increased wear manifests itself in more or less pronounced grooves which are found in the edge regions of the tread and which reduce the life of the tire considerably.

Practical investigations have shown that this type of wear of a tire by the appearance of grooves in the outer tread regions is found primarily in tires on the front axle of a vehicle whose rear support is effected by two or more rigid axles. This phenomenon is found particularly in cases where the distance between the front axle and the rear axle group is relatively small or when the rear axle group is particularly heavily loaded.

The reason for this specific wear phenomenon can be the lateral forces which act on the tires when the direction of travel of the vehicle is changed. In this maneuver the trailing part of the vehicle has a tendency to maintain its original direction of motion, which tendency must be counteracted by the tires of the front steering axle. The inertial tendency of the trailing part of the vehicle is the greater, the shorter the distance between the axles is or the higher the axial load of the rear rigid axles is.

It is an object of the present invention to improve a tire of the radial ply type in such a way that the above described wear phenomenon is counteracted, so that a uniform wear of the tread occurs and the life of the tire is not shortened by increased wear of the edge regions of the tread profile.

This problem is solved in accordance with one embodiment of the invention in this way that the fiber-reinforced layer extends beyond the belt into the shoulder regions and there is mounted at the same time in each of the shoulder regions an additional strip of cord fabric. Preferably the fiber-reinforced layer in the shoulder zone has a substantially greater thickness than under the tread surface region.

The additional strips of cord fabric provided in the shoulder zones can be arranged between the belt and the fiber-reinforced layer. With particular advantage, however, these strips are arranged between the fiber-reinforced layer and the carcass. On the basis of the new arrangement the shoulder zones are stiffened additionally, and show increased shock absorption, particularly for low-frequency vibrations, so that the groove-like wear phenomena which appear as a result of such vibrations primarily in the above described situations are greatly attenuated.

In another embodiment of the invention, a fiber-reinforced shoulder strip is disposed, together with another shoulder strip of cord material, between the carcass and the edges of the belt. Advantageously, in the second-mentioned embodiment the additional shoulder strip of cord material is disposed between the carcass add the fiber-reinforced strip. In the second-mentioned embodiment of the invention, the shoulder zones receive reinforcement in conjunction with attenuation particularly of low frequency vibrations, which contribute to the groove-like wear phenomena to a great extent. In both embodiments of the invention, the wear in the edge regions of the tread is uniform with the new design of the tire, and it is not greater than in the central region of the tread so that the life of such a tire is considerably prolonged.

Particularly good results can be achieved if the additional strips of cord fabric extend inwardly under the tread surface in a width corresponding to about 3/10 of the tread width and also extend under the edges of the belt. An improvement can also be achieved by having the additional strips of cord fabric extend into the sidewall region approximately up to a height corresponding to about 7/10 of the total height of the tire cross section, as described subsequently.

For a better understanding of the present invention, together with other and further objects thereof, reference is had to the following description taken in connection with the accompanying drawings and its scope will be pointed out in the appended claims.

Referring now to the drawings.

Figure 1:
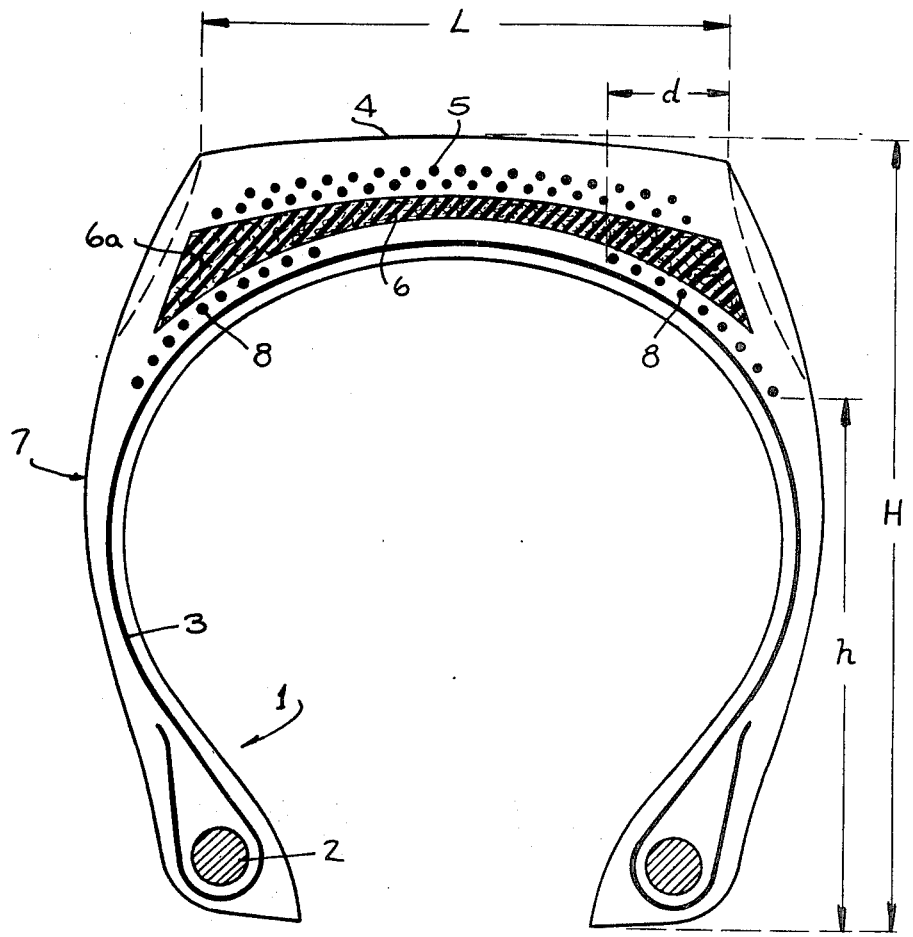
FIG. 1 is a cross-sectional view, partly schematic, of a first embodiment of a tire constructed in accordance with the invention.

Referring now to FIG. 1 of the drawings, the tire represented in FIG. 1 comprises a carcass 1 with one or more plies 3 of a cord fabric preferably of textile or metal. The individual cords of the plies extend substantially radially, hence they form an angle of about 90° with the circumferential direction of the tire. The edges of the plies are placed in known manner around the bead wires 2.

The tire has furthermore below the tread surface 4 a belt which comprises one or more reinforcement inserts 5 of metallic cords which extend parallel to each other and in a small angle of about 20° to 30° to the circumferential direction. If the belt consists of several reinforcement layers 5, as in the FIG. 1 embodiment, the cords extend preferably in the individual layers under opposite angles to the circumferential direction so that the cords of the several layers cross each other.

Between the ply 3 of cord fabric and the belt 5 of the tire is arranged according to the invention a rubber layer 6 with embedded short fibers of textile, metal or other materials, for example, glass, as well as shoulder strips 8, preferably of fabric having metal cords. In the FIG. 1 embodiment the shoulder strips 8 are directly above the cord fabric of the carcass, while the rubber layer is arranged between the shoulder strips 8 and the belt 5. This arrangement is preferred for strips 8 and layer 6.

The shoulder strips 8 preferably comprise a fabric whose metal cords extend parallel to each other and which form with the main circumferential direction of the tire an angle of between 60° and 80°, thereby forming with the layers of the belt 5 a triangulated structure which is rigid in the circumferential and lateral directions of the tire in the shoulder regions of the tire compared with the crown region of the tread.

The fiber-reinforced rubber layer 6 extends laterally beyond the belt 5 while this fiber-reinforced layer is in turn mounted over the reinforcing strips or shoulder strips 8 which extend in the direction of the sidewalls 7 of the tire. The shoulder strips 8 preferably extend up to a distance d from the edge of the tread down under the tread surface region which corresponds to about 3/10 of the total width L of the treads. Furthermore, the shoulder strips 8 should preferably extend downward in the sidewall region 7 up to a height h, which corresponds to about 7/10 of the total height H of the entire tire cross section.

Instead of making the shoulder strips of fabric having metal cords, other strips having plastic cords or cables can also be used, provided they have a comparable strength.

The fiber-reinforced rubber layer 6 preferably has in the shoulder zones a substantially greater thickness than in the region under the tread surface, so that a greater shock absorbing effect is ensured in the shoulder zones, corresponding to the greater vibrational stress. At the same time a better transmission of the forces to the shoulder strips 8 is achieved. On the average the thickness of the rubber layer 6 in the region of the tread should be about 3–10 millimeters. Further the rubber mixture preferably has a hardness of 60 to 80 Shore A. The fibers in the rubber layer 6 can be disordered or be oriented in the circumferential direction.

Figure 2:
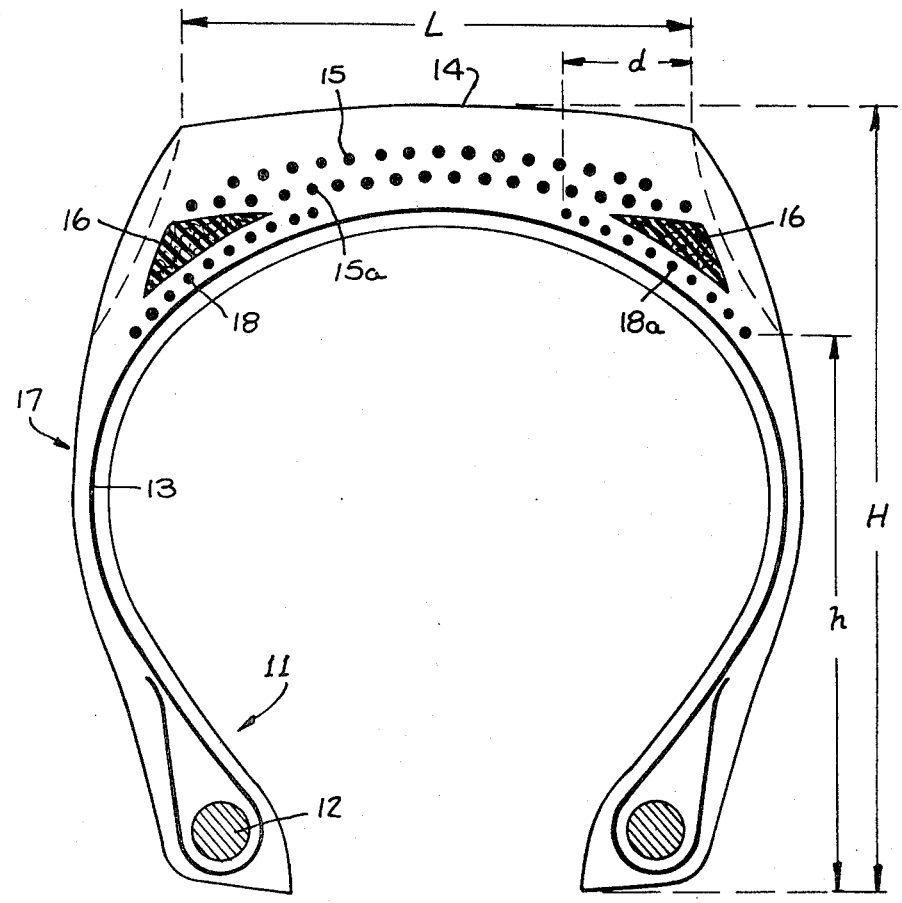
FIG. 2 is a cross-sectional view, partly schematic, of a second embodiment of a tire constructed in accordance with the invention.
Figure 2A:
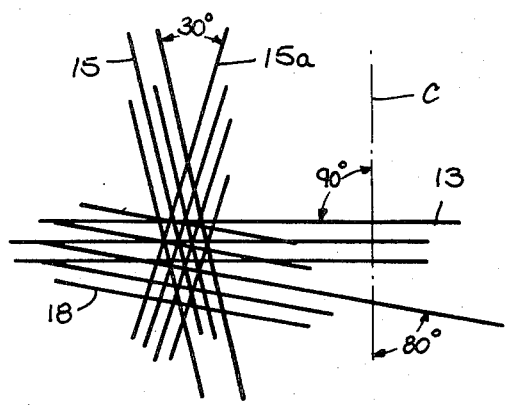
FIG. 2a is a diagram representing the angular relations of components of the tire of FIG. 2.

Referring now to FIG. 2, the tire represented therein comprises a carcass 11 with one or more plies 13. As is shown in the drawing, the various cords of the plies run essentially radially, thus including with the circumferential direction C of the tire an angle of approximately 90°, as represented in FIG. 2a. The edges of these plies 13 are laid around the bead wires 12 in the usual manner.

The tire further presents, below the tread surface 14, a belt comprising one or more reinforcment inserts 15, 15a preferably of metallic cords oriented parallel to each other and at a slight angle to the circumferential direction. If as in the example represented, the belt consists of several such reinforcement inserts 15, 15a, the cords in the various layers preferably run at opposing angles to the circumferential direction so that the cords cross each other, as is evident from the orientation drawing of the cords in FIG. 2a. In the example shown, the cords of layers 15, 15a of the belt include an angle of 30°.

Between the ply 13 of the carcass 11 and the belt 15 or 15a are disposed, according to the invention, in the area of the shoulder zones, a pair of shoulder strips 16, 16 of a fiber-reinforced rubber material and another pair of shoulder strips 18, 18a of a cord material. As mentioned above, the fibers embedded in the shoulder strip 16 may, for example, comprise textiles, metal or glass or the like. It is preferred that the shoulder strips 16, 16 have a hardness of 60 to 80 Shore A. The cords of the additional reinforcing strips 18, 18a of cord material preferably run at an angle of 60° to 80° relative to the circumferential direction of the tire, as again is evident from the orientation diagram of FIG. 2. The cord material may, for example, comprise metal, plastic, glass or the like. The shoulder strips 18, 18a may lie over the layers 16, 16 of fiber-reinforced rubber. It is preferred, however, for the additional shoulder strips 18, 18a of cord material to be disposed between the carcass 11 and the shoulder strips 16, 16 of fiber-reinforced material.

It will be seen that each shoulder strip 16 partly underlies the belt 15, 15a and partly extends outwardly, reaching into the sidewall areas 17. At the same time, shoulder strips 16, 16 overlie the additional shoulder strips 18, 18a which likewise extend below the belt and reach farther into the sidewall areas 17.

It is particularly advantageous for the additional shoulder strip 18 to extend to a distance d from the edge of the tread surface to under the tread surface area, which distance corresponds to approximately 3/10 of the overall width L of the tread surface. Furthermore, the shoulder strips 18, 8a should perferably reach downwardly into the sidewall area 17 to a level h which corresponds to approximately 7/10 of the overall height H of the entire cross section of the tire.

The additional shoulder strips 18, 18a must have great strength.

The shoulder strips of fiber-reinforced rubber material should match the shape of the shoulder zones, which can be accomplished in most cases by an approximately triangular cross-sectional shape. The strips 16, 16 may be very thin or have a thickness of several millimeters. Their width may equal or, as a rule, be slightly less than the width of the additional reinforcing strips 18, 18a.

While there have been described what are at present considered to be the preferred embodiments of this invention, it will be obvious to those skilled in the art that various changes and modifications may be made therein without departing from the invention, and it is, therefore, aimed to cover all such changes and modification as fall within the true spirit and scope of the invention.

Having thus described my invention, what I claim and desire to protect by Letters Patent is:

1. A pneumatic tire having tread, shoulder and sidewall regions comprising:
   a carcass including at least one ply of fabric having members disposed substantially radially of the tire;

a pair of strips of fabric over said carcass, one strip being at each shoulder region of the tire and each strip extending substantially circumferentially of the tire and extending into each sidewall region and having cord members obliquely disposed with respect to the circumference of the tire;

a reinforcing belt extending substantially circumferentially of the tire over said fabric ply and over said fabric strips;

fiber-reinforced elastomeric material having a multiplicity of short fibers therein and disposed partially under said belt and disposed in layered relation to said strip at each shoulder region of the tire, said fiber-reinforced material having thicker portions disposed nearer the shoulder boundaries of the tread and sidewall regions of the tire and thinner portions extending toward the central tread region of the tire;

and tread, shoulder and sidewall portions of elastomeric material over said carcass.

2. A tire in accordance with claim 1 in which said fiber-reinforced material extends partially beyond said belt at each shoulder region of the tire.

3. A tire in accordance with claim 1 in which said fiber-reinforced material comprises a layer of approximately triangular cross-sectional shape at each shoulder region of the tire.

4. A tire in accordance with claim 1 in which each of said pair of strips is disposed between said fiber-reinforced material and said carcass.

5. A tire in accordance with claim 1 in which said cord members of said strips are of metal.

6. A tire in accordance with claim 1 in which said members of said strips are disposed at an angle in the range of 60° to 80° relative to the circumferential direction of the tire.

7. A tire in accordance with claim 1 in which said pair of strips individually extend under said tread portion of the tire a distance equal to approximately 3/10 of the width of said tread portion.

8. A tire in accordance with claim 1 in which said sidewall portions have inner circumferences and in which said pair of strips individually extend to points in said sidewall portions which are a distance of approximately 7/10 of the width of said sidewall portions removed from said inner circumferences of said sidewall portions.

9. A pneumatic tire having tread, shoulder and sidewall regions comprising:

a carcass including at least one ply of fabric having members disposed substantially radially of the tire;

a pair of strips of fabric over said carcass, one strip being at each shoulder region of the tire and each strip extending substantially circumferentially of the tire and having cord members obliquely disposed with respect to the circumference of the tire;

a reinforcing belt extending substantially circumferentially of the tire over said fabric ply and over said fabric strips;

a layer of fiber-reinforced elastomeric material having a multiplicity of short fibers therein and disposed partially under said belt and disposed in layered relation to said strip at each shoulder region of the tire, said layer of fiber-reinforced material extending from one shoulder region of the tire to the other and being thicker in the shoulder regions of the tire than under the central portion of said tread region;

and tread, shoulder and sidewall portions of elastomeric material over said carcass.

* * * * *